United States Patent Office 2,851,352
Patented Sept. 9, 1958

2,851,352

ACID PRE-TREATMENT OF TETRAETHYL LEAD SLUDGE

Rita A. Erickson, Baton Rouge, La.

No Drawing. Application March 7, 1956
Serial No. 569,966

2 Claims. (Cl. 75—115)

This invention relates to the recovery of lead values from waste lead-bearing materials and is especially useful in the recovery of metallic lead from tetraethyl lead sludge. Such sludge is a by-product of the manufacture of tetraethyl lead by processes which are well known, such for instance as the process used by E. I. du Pont de Nemours & Company and that used by Ethyl Corporation.

The invention is in the nature of an improvement on a portion of the technique referred to in Erickson Patent No. 2,184,520, which is also concerned with the recovery of metallic lead from tetraethyl lead sludge.

As mentioned in said patent tetraethyl lead sludge may contain anywhere from about 5% to about 30% of sodium chloride by weight; and as pointed out in said Erickson patent it is advantageous to preliminarily treat the sludge, prior to smelting or other thermal recovery process, in order to reduce the sodium chloride content to a point below 2.5% of the sludge by weight, a value not above .5% being preferred.

Such preliminary treatment, according to said Erickson patent, is accomplished by a leaching operation, in which the soluble constituents, including the sodium chloride, are flushed out of the sludge.

I have found that tetraethyl lead sludges also commonly contain substantial percentages of soluble lead salts, especially lead chloride and that the lead values represented by such materials are lost in the leaching process of the Erickson patent.

The present invention provides an improved method for preparing tetraethyl lead sludge for recovery of metallic lead therefrom, the improved method of preparation providing for the conversion of the soluble lead chloride to an insoluble lead salt, so as to avoid loss of this lead value.

Briefly, the process of the invention contemplates initially treating the sludge with an aqueous solution containing the sulphate radical, for example an aqueous solution of $H_2SO_4$. This converts the lead chloride present to lead sulphate, which latter is insoluble. Thereafter the treated sludge is preferably flushed with water in order to remove sodium chloride and other soluble impurities and reaction products. Following this preparation, the pretreated and flushed sludge is then subjected to a thermal treatment for recovery of metallic lead therefrom. Any of various thermal treatments may be employed for this purpose, including a variety of thermal treatments already well known.

In connection with the foregoing treatment it is pointed out that the sulphate ion in the aqueous solution may be supplied by employment of any one of a number of agents, preferably $H_2SO_4$ (sulfuric acid), $NaHSO_4$ (sodium acid sulfate), or $Na_2SO_4$ (disodium sulfate), although still other agents may be used for this purpose, for instance—

| | |
|---|---|
| $(NH_4)_2SO_4$ | ammonium sulfate |
| $(NH_4)_2SO_4$ | aluminum sulfate |
| $K_2SO_4$ | potassium sulfate |
| $Al_2(SO_4)_3$ | aluminum sulfate |
| $CuSO_4$ | cupric sulfate |
| $Fe_2(SO_4)_3$ | ferric sulfate |
| $ZnSO_4$ | zinc sulfate |

The amount of agent employed may vary, for instance according to the content of lead chloride in the sludge to be treated. When using $H_2SO_4$, the amount employed may be from 0.1 to 1.0% of the weight of the sludge being treated. When using any of the other agents a molecularly equivalent amount may be used.

Although the concentration of the solution employed for the treatment may vary between rather wide limits, I have found it convenient to dissolve the agent in a weight of water in the neighborhood of the weight of sludge to be treated.

The treatment should be continued for a period of from about 1 to 24 hours at ordinary or room temperature.

After separation of the insoluble constituents from the above mentioned treatment solution, the insoluble constituents are preferably flushed with water to remove residual soluble materials.

After the flushing with water the material is preferably dried, for instance either mechanically or naturally, whereupon it is charged to a furnace for thermal recovery of metallic lead from the sludge. An appropriate thermal treatment which may be employed is referred to in the Erickson patent hereinabove identified.

Inasmuch as tetraethyl lead sludge contains a substantial percentage of lead in the form of soluble lead chlorides, the conversion of such lead compounds to insoluble salts results in the recovery of substantially more lead than is possible when the tetraethyl lead sludge is thermally treated after pretreatment processes such as that disclosed in the above-mentioned Erickson patent.

I claim:

1. In the recovery of metallic lead from tetraethyl lead sludge containing sodium chloride and lead chloride, the process which comprises treating such sludge with an aqueous solution containing sulfate ions in which the concentration of the sulfate ions in said solution is equivalent to that provided by from 0.1 to 1.0% of $H_2SO_4$, whereby to substitute sulfate ions for the chloride ions of said lead chloride, and separating the insoluble constituents of the sludge including lead sulfate from said solution, and thereafter subjecting said insoluble constituents to a thermal treatment for recovery of metallic lead therefrom.

2. In the recovery of metallic lead from tetraethyl lead sludge containing sodium chloride and lead chloride, the process which comprises treating such sludge with an aqueous solution containing sulfate ions in which the amount of sulfate ion is equivalent to that provided by from 0.1 to 1.0 % of $H_2SO_4$ calculated on the weight of the sludge treated, whereby to substitute sulfate ions for the chloride ions of said lead chloride, and separating the insoluble constituents of the sludge including lead sulfate from said solution, and thereafter subjecting said insoluble constituents to a thermal treatment for recovery of metallic lead therefrom.

References Cited in the file of this patent

UNITED STATES PATENTS

| | | |
|---|---|---|
| 1,484,088 | Schumacher | Feb. 19, 1924 |
| 1,783,986 | Stewart | Dec. 9, 1930 |
| 1,918,817 | Mantell | July 18, 1933 |

UNITED STATES PATENT OFFICE
CERTIFICATE OF CORRECTION

Patent No. 2,851,352                            September 9, 1958

Rita A. Erickson

It is hereby certified that error appears in the printed specification of the above numbered patent requiring correction and that the said Letters Patent should read as corrected below.

Column 2, line 2, strike out "$(NH_4)_2SO_4$ ------- aluminum sulfate".

Signed and sealed this 9th day of December 1958.

(SEAL)
Attest:

KARL H. AXLINE                                   ROBERT C. WATSON

Attesting Officer                               Commissioner of Patents